United States Patent [19]

Hata et al.

[11] Patent Number: 4,827,815
[45] Date of Patent: May 9, 1989

[54] HOLLOW-SPINDLE METHOD OF MACHINING A SHORT-LENGTH WORKPIECE

[75] Inventors: Yoshikuni Hata; Tomio Ushigoe, both of Ueda, Japan

[73] Assignee: Kabushiki Kaisha Miyano, Nagano, Japan

[21] Appl. No.: 174,771

[22] Filed: Mar. 29, 1988

Related U.S. Application Data

[62] Division of Ser. No. 7,322, Jan. 27, 1987, Pat. No. 4,763,549.

[30] Foreign Application Priority Data

Feb. 10, 1986 [JP]  Japan .................................. 61-27098

[51] Int. Cl.$^4$ .......................... B23B 1/00; B23B 3/06; B23B 15/00
[52] U.S. Cl. ...................................... 82/1.11; 82/124; 82/147
[58] Field of Search ................... 82/1 C, 2.5, 28 R, 30, 82/36 A

[56] References Cited

U.S. PATENT DOCUMENTS

| 4,064,774 | 12/1977 | Maddock | 82/2.5 |
| 4,090,423 | 5/1978 | Waage | 82/2.5 |
| 4,402,120 | 9/1983 | Haygood | 29/40 |
| 4,445,405 | 5/1984 | Champeau et al. | 82/2.5 |
| 4,457,193 | 7/1984 | Matthey | 82/2.5 |

Primary Examiner—Frederick R. Schmidt
Assistant Examiner—William E. Terrell
Attorney, Agent, or Firm—Ladas & Parry

[57] ABSTRACT

A method of machining short-length workpieces provides a hollow spindle adapted to be driven in rotation around a longitudinal axis thereof, the spindle having first and second chucks at one and the other longitudinal ends thereof, respectively. A short-length workpiece is gripped by the first chuck and the spindle and workpiece gripped by the first chuck are rotated for performing a primary operation of machining on one end of the workpiece. The first chuck is then loosened to release the workpiece and the workpiece conveyed within the first chuck through the hollow interior of the spindle into the second chuck, which is in a loosened state, by pushing the workpiece from one longitudinal end of the spindle to other. The second chuck is then tightened to grip the workpiece so as to rotate the workpiece together with the spindle for performing a secondary operation of machining on the opposite end of the workpiece. Finally, the second chuck is loosened to release the workpiece. An alternative embodiment provides for machining on a pair of parallel spindles having oppositely facing chucks.

9 Claims, 3 Drawing Sheets

HOLLOW-SPINDLE METHOD OF MACHINING A SHORT-LENGTH WORKPIECE

This is a divisional of co-pending application Ser. No. 007,322 filed on JAN. 27, 1987 U.S. Pat. No. 4,763,549.

BACKGROUND OF THE INVENTION

1. Field of the Invention

This invention relates to the method of hollow-spindle machine tools, and particularly lathes, for primary and secondary machining, successively, a number of short-length workpieces.

The term "short-length workpieces" as hereinused means a workpiece which is holdable by a chuck. Thus, elongated bars, rods and the like are excluded.

2. Description of the Prior Art

It is frequently necessary in the field of machining to execute a primary and a secondary machining successively on opposite ends, respectively, of each of a large number of similar workpieces with a single machine tool.

A representative conventional method for this uses two rotatable spindles carrying chuck units arranged in opposition to each other, at least one of these spindles reciprocating along the common axis of the two. In this case, the primary machining is carried out while the workpiece is held by one chuck unit, and then the secondary machining is executed upon transfer of the workpiece to the second chuck unit. For this, reference may be had to U.S. Pat. No. 4,457,193.

It is also known to use one spindle carrying a single chuck unit. In this case, the primary machining is carried out while the workpiece is held by the single chuck unit, and then either a robot or a loader provided with a position reverser is used. The already primary-machined workpiece is released from the chuck unit, subjected to the position-reversing operation of the robot or loader and rechucked in the same chuck unit.

In the former case, with the two spindles, at least one of the spindles must be mounted on a reciprocable feeder, thereby requiring increased space and manufacturing cost for the machine tool.

In the latter case, the robot or loader must be additionally provided, again requiring increased space and cost.

SUMMARY OF THE INVENTION

It is, therefore, an object of the present invention to provide an improved machine tool capable of performing primary and secondary machining and intermediate feed of a workpiece therebetween in a highly smooth and economical manner with an amazingly simplified mechanism.

For this and further objects, the invention provides a machine tool, and particularly a lathe, for machining successively a number of short-length workpieces in primary and secondary steps. It has a spindle stock and a hollow spindle rotatably mounted on the spindle stock. A first tool head is shiftable on the machine tool in proximity to one end of the hollow spindle for execution of the first, i.e. primary, machining step. A second tool head is shiftable on the machine tool in proximity to the other, i.e. opposite, end of the hollow spindle for execution of the second, i.e. secondary, machining step. A chuck unit is provided at the other end of said hollow spindle for holding successive primary-machined workpieces. The inside wall surface of the hollow spindle and inside surface of the chuck unit jointly provide a smooth and continuous guide surface for the workpieces.

BRIEF DESCRIPTION OF THE DRAWINGS

The above and further objects, features and advantages of the invention and the manner of attaining them will become more apparent and the invention itself will be best understood by reference to the following detailed description of preferred embodiments of the invention taken in conjunction with the accompanying drawing, in which.

DESCRIPTION OF PREFERRED EMBODIMENTS

Figure 1:
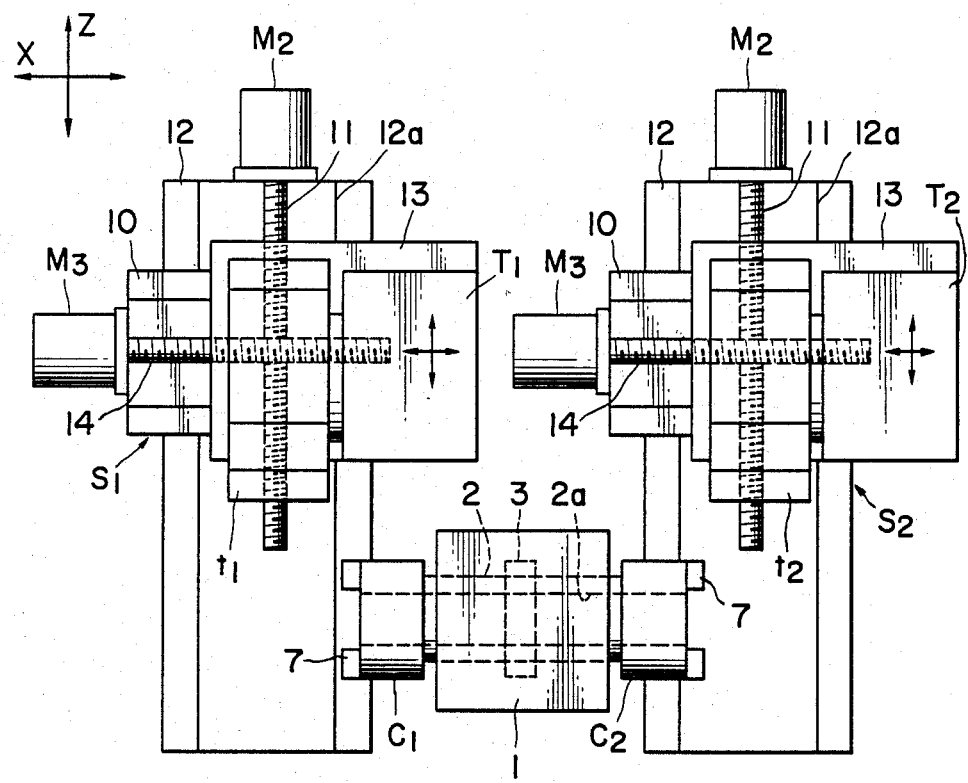
FIG. 1 is a schematic top plan view of a preferred embodiment of the machine tool of the invention.

In FIG. 1, a hollow spindle 2 is rotatably mounted on a spindle stock 1. The spindle stock is stationarily mounted on a supporting surface of a rigid base which is not shown only for convenience of the drawing. The supporting surface of the base may be horizontal, as may be easily supposed from FIG. 1. However, if occasion may desire, the supporting surface may be inclined at any desired angle in another embodiment (not shown). Thus, in an extreme case, the supporting surface may be vertical.

The hollow spindle 2 has a passage 2a therethrough, chucks $C_1$ and $C_2$ being integral with the spindle at opposite ends of the passage. Spindle 2 is mounted in a pair of ball bearings 6. The spindle is rotated by a drive wheel 3, which is fixedly mounted thereon. The drive wheel 3 is formed, as a preferred example, by a pulley, as shown in schematic section in FIG. 2. An endless belt 5 is tensioned around the drive wheel 3 and a further pulley 4, which is direct coupled with the spindle of a motor $M_1$. Thus, with energization of the motor $M_1$, the hollow spindle 2 is caused to rotate.

Figure 2:
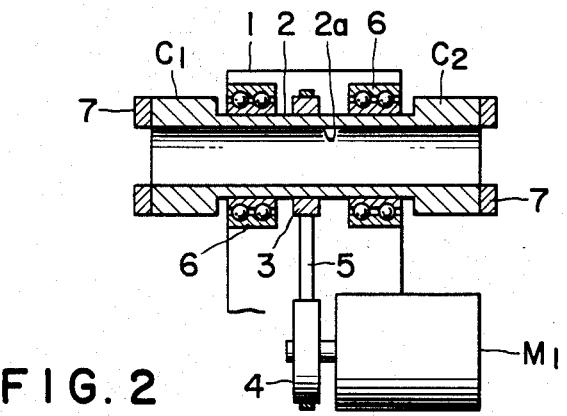
FIG. 2 is a schematic longitudinal elevation, partly in section, of essential portions of the machine tool shown in FIG. 1, including a spindle stock, a spindle and a chuck unit.

In addition, it will be seen from FIGS. 1 and 2, that an inside, workpiece-gripping portion of each of the chucks and the inside hollow passage 2a of the spindle have a common cross-sectional configuration, preferably circular, thereby providing a smooth and continuous inside guide surface. At the outside of each of the chucks $C_1$, $C_2$, there are a plurality of, and preferably three, chucking jaws 7, which are movable radially, as conventional. As the chuck operating mechanisms, any conventional devices can be used, and thus, they are not shown.

Figure 3:
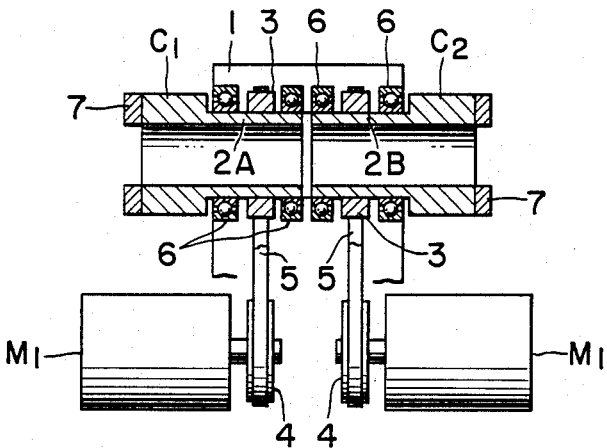
FIG. 3 is a schematic longitudinal elevation, partly in section, of a further preferred embodiment of the essential portions shown in FIG. 2.

In FIG. 3, the hollow spindle has two, slightly spaced, aligned spindle sections 2A, 2B. At each of the outer ends of the spindle sections, there is provided, as before, a chuck unit $C_1$, $C_2$, respectively. The spindle sections are driven through pulley 3, endless belt 5 and further pulley 4 from respective drive motors $M_1$, so as to be driven at mutually independent rotational speeds.

Returning to FIG. 1, tool heads $T_1$ and $T_2$ are provided on the machine tool at the respective chuck units $C_1$, $C_2$. The tool heads $T_1$, $T_2$ support respective turrets $t_1$, $t_2$, which are rotatable, as commonly known, at the operator's will. The tool heads are mounted on respective tool slides $S_1$, $S_2$, so as to shift in perpendicular directions X and Z.

The tool slides $S_1$ and $S_2$ have similar structures and functions. Each has a slider 10, which is slidable along a guide 12a of a bed 12 in the direction Z to feed a tool (not shown). This tool feed in the direction Z is effected by a feed screw 11, which is driven by a servo-motor $M_2$. Another slider 13 is supported on the slider 10 and slidable in the direction X by a cross feed screw 14, which is driven by another servo-motor $M_3$. The tool head is supported on the slider 13.

According to one mode of operation of the machine-tool embodiments so far described, machining a short-length workpiece W (shown in FIGS. 4 and 5) may be carried out in the following way.

At first, the workpiece W is held in chuck unit $C_2$ on one end of the hollow spindle 2 by its chuck jaws 7 for a primary or first machining operation. For example, turning can be executed by a tool at 16 in FIGS. 5 on the turret $t_2$.

Figure 4:
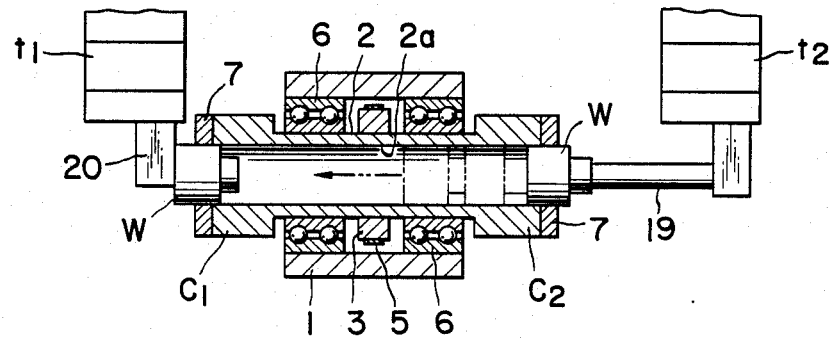
FIG. 4 is a schematic plan view, partly in section, of a portion of the embodiment of FIG. 1 during transfer operation on workpieces therein.
Figure 5:
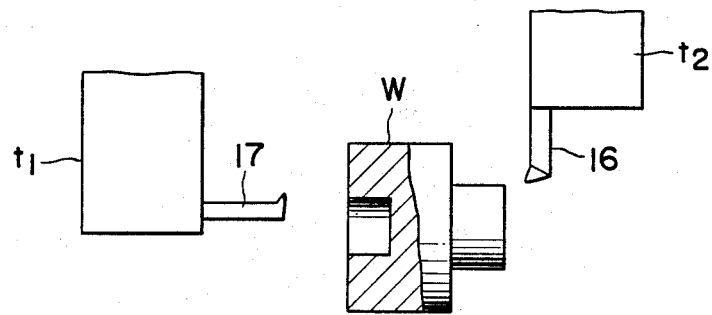
FIG. 5 is a schematic plan view of a portion of the embodiment of FIG. 1 with a workpiece therefor.

Upon completion of the foregoing first machining operation, the rotational drive of the spindle 2 (by motor(s) $M_1$, as described above) is stopped and the turret $t_2$ is rotated to the position of a pusher rod 19 (FIG. 4). The turret $t_2$ is slid with the tool slide $S_2$, until the pusher rod 19 opposes the workpiece W as schematically illustrated in FIG. 4. Further, the chuck $C_2$ is loosened, and the tool slide $S_2$ then advances the pusher rod 19 into the hollow space 2a of the spindle towards other chuck $C_1$. By this operation, the semi-fabricated, i.e. primary-machine workpiece W could be pushed into the inside space of the chuck $C_1$. In practice, however, a number of such semi-fabricated workpieces are accumulated in the hollow space 2a of the spindle. In this way, successive recharges of workpieces into the other chuck $C_1$ can be economically and efficiently executed one after another with a shorter working, i.e. workpiece-pushing stroke of the pusher rod.

Upon introduction of each semi-fabricated workpiece W into other chuck unit $C_1$, its jaws 7 are tightened for holding it. The position of the thus-introduced workpiece is determined by a stopper 20 on the turret $t_1$. Upon completion of this chucking operation, the turret $t_2$ is rotated to position a tool at the workpiece, the spindle 2 is drivingly rotated and a secondary machining operation is executed with a tool on turret $t_1$. The secondary machining can be, for instance, an inside turning operation with the tool 17 shown in FIG. 5, and is on the opposite end of the workpiece W from the primary machining operation.

While the secondary machining is being executed, a further workpiece can be held in the chuck $C_2$, and thus, the primary and secondary machining steps can be performed simultaneously. Tightening and loosening of the two chucks $C_1$ and $C_2$ can be done in a parallel manner.

According to the invention, the inside surface 2a of spindle 2 and the inside hollow surfaces of chucks $C_1$, $C_2$ provide, jointly, a smooth, stepless and continuous guide surface, as shown in FIG. 4. As a result, positive and smooth successive conveyances of primary-machined workpieces along the guide surface is assured.

As clearly seen from the foregoing description and according to the main features of the invention, the primary-machined short-length workpieces are transferred directly from the position of such machining to the chuck for execution the secondary machining through the hollow space of the spindle, thereby attaining quicker and more positive workpiece transfer with a simpler, smaller structure.

It is also possible to arrange a number of the foregoing embodiments in a matrix of generally parallel manufacturing lines, thereby realizing systematic and flexible control of a system for the introduction and discharge of a large number of machining and machined workpieces having considerable advantages and benefits.

Figure 6:
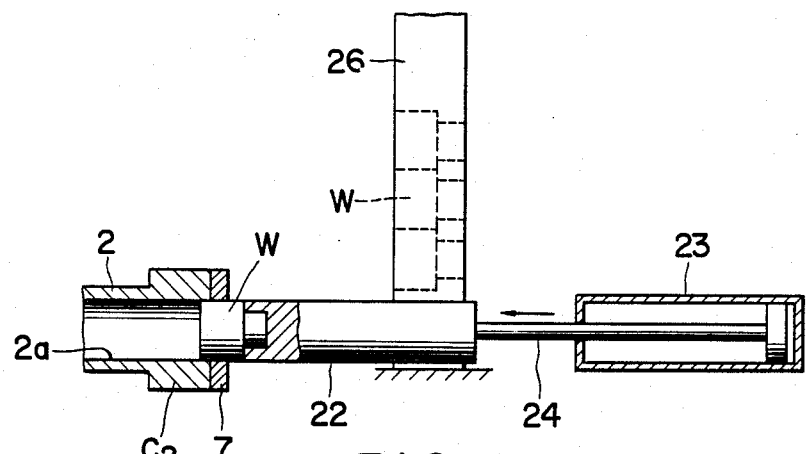
FIG. 6 is a partly-sectional elevational view of a workpiece-fed portion of the embodiment of FIG. 1 with workpieces therefor.
Figure 7:
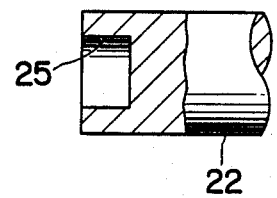
FIG. 7 is an enlarged, partly-sectional elevational view of a pusher-rod portion of the portion shown in FIG. 6.

FIGS. 6 and 7 show a mechanism for successive transfer of a plurality of workpieces W to the chuck $C_2$ for the primary machining. One end of a pusher bar 22 is fixedly attached to the piston rod 24 of a pneumatic cylinder unit 23. The opposite end of the pusher bar 22 has a recess 25 with a general configuration for receiving one of the workpieces W. A hopper or chute 26 has a conventional structure for feeding successive workpieces W to a leading or lowest outlet end where one will be caught in the recess 25 and pushed from the outlet and when the pneumatic piston and cylinder unit advances bar 22 from a retracted position past the outlet end of the chute 26. With further such advancement of the pusher bar, the workpiece is introduced into the chuck $C_2$, and so on for successive workpieces.

Figure 8:
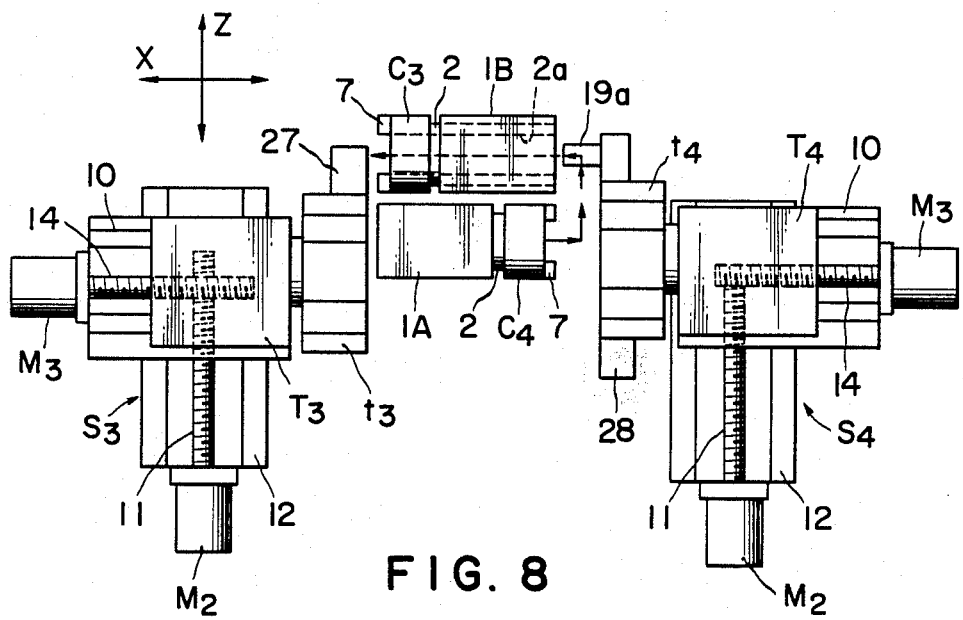
FIG. 8 is a schematic top plan view of a still further preferred embodiment of the machine tool of the invention.

In FIG. 8, another embodiment of the invention is illustrated. In this embodiment, two spindle stocks 1A and 1B are fixed in parallel.

A spindle 2 on the first spindle stock 1A is provided only at one end with a chuck unit $C_4$. A hollow spindle 2 on the second spindle stock 1B is also provided only at one, but opposite end with a chuck unit $C_3$. The hollow spindle 2 of the second spindle stock 1B is open at its other, opposite end, which end is situated in the neighborhood of the chuck unit $C_4$.

A first tool head $T_3$ is provided at the end with chuck unit $C_3$, and a second tool head $T_4$ is provided at the end with chuck unit $C_4$. The tool heads $T_3$ and $T_4$ are mounted on respective tool slides $S_3$ and $S_4$, which are substantially similar to the aforementioned tool slides $S_1$ and $S_2$ shown in FIG. 1. Thus, each of these tool slides $S_3$ and $S_4$ comprises servo-motors $M_2$ and $M_3$, feed screws 11 and 14, and sliders 10 and 12. Further, the tool heads $T_3$ and $T_4$ have turrets $t_3$ and $t_4$, respectively. Turret $t_3$ is provided on its periphery with a work holder 27, and turret $t_4$ is provided on its periphery with a workpiece holder 28 as well as a pusher rod 19a, which projects from its front surface.

In operation, at first, a short-length workpiece (not shown in FIG. 8) is held in chuck unit $C_4$ while its spindle 2 is rotated. Primary machining is then executed on the workpieces in the chuck unit $C_4$ by a machining tool (not shown) on the turret $t_4$ of tool head $T_4$.

When the primary machining is finished, the rotation of the spindle 2 with chuck unit $C_4$ is stopped, the chuck unit $C_4$ is loosened, and the primary-machined workpiece is held by the work holder 28 of turret $t_4$, which removes the workpiece from the chuck unit $C_4$. Then, tool slide $S_4$ is shifted to bring the workpiece to such a position relative to the open end and inner hollow space 2a of the hollow spindle 2 of the spindle stock 1B as to be ready for advancing the workpiece into the hollow space of the spindle towards the chuck $C_3$. Then, the workpiece is so pushed by the pusher rod 19a of the turret $t_4$ by operation of the tool slide $S_4$ into the chuck $C_3$.

Upon conveyance of the primary-machined workpiece into the chuck $C_3$, the latter is retightened for chucking the workpiece, the hollow spindle 2 is again brought into rotation, and the workpiece is subjected to secondary machining by use of the tool on turret $t_3$. After this, chuck $C_3$ is loosened and the workpiece is removed therefrom with a workpiece holder 27 on the turret $t_3$.

It will be seen from the foregoing description also that the primary-machined, short-length workpiece is simply and rapidly conveyed for secondary machining without broadening the conveying space. Indeed, the inside of the hollow spindle is used to prepare for the next-succeeding secondary machining operation.

We claim:

1. A method of machining short-length workpieces, comprising the steps of:
   providing a hollow spindle adapted to be driven in rotation around a longitudinal axis thereof, said spindle having first and second chucks at one and the other longitudinal ends thereof, respectively;
   causing a short-length workpiece to be gripped by said first chuck;
   rotating said spindle and hence the workpiece gripped by the first chuck;
   performing a primary operation of machining the workpiece, while the latter is being rotated, at one end thereof;
   loosening the first chuck to release the workpiece after the primary machining operation;
   conveying the released workpiece within the first chuck through the hollow interior of said spindle into said second chuck, which is in loosened state, by pushing the workpiece from said one longitudinal end to said other longitudinal end of the spindle;
   tightening the second chuck to grip the workpiece by the second chuck so as to rotate the workpiece together with the spindle;
   performing a secondary operation of machining the workpiece, while the latter is being rotated, at the other end thereof; and
   loosening the second chuck to release the workpiece which has been subjected to the primary and secondary machining operations.

2. The method of claim 1, further comprising the steps of causing a new workpiece to be gripped by the first chuck, before performing the secondary machining operation, and performing the first machining operation on the new workpiece concurrently with the secondary machining operation.

3. The method of claim 1 wherein said step of conveying the workpiece through the hollow interior of the spindle is carried out by advancing a pusher rod into the hollow interior from one longitudinal end of the spindle towards the other longitudinal end of the same.

4. The method of claim 3 wherein said pusher rod is mounted on a tool head and the pusher rod is advanced by shifting the tool head towards the first chuck.

5. The method of claim 1, further comprising the step of causing the workpiece, which is being conveyed into the second chuck, to abut against a stopper to stop the workpiece at a predetermined position relative to the second chuck.

6. A method of machining short-length workpieces, comprising the step of:
   providing first and second spindles disposed in parallel and side-by-side relation, the first spindle having a first chuck at one longitudinal end thereof, the second spindle having a hollow interior and carrying a second chuck at its end remote from said first chuck;
   causing a short-length workpiece to be gripped by said first chuck;
   rotating said first spindle and hence the workpiece gripped by said first chuck;
   performing a primary operation of machining the workpiece, while the latter is being rotated, at one end thereof;
   loosening the first chuck to release the workpiece after the primary machining operation;
   removing the thus released workpiece out of the first chuck and conveying the same to a position confronting the end of the second spindle, remote from the second chuck, to insert the workpiece into the hollow interior of the second spindle;
   pushing the workpiece through said hollow interior into the second chuck;
   tightening the second chuck to grip the workpiece by the same so as to rotate the workpiece together with the second spindle;
   performing a secondary operation of machining the workpiece, while the latter is being rotated, at the other end of the workpiece; and
   loosening the second chuck to release the workpiece which has been subjected to the primary and secondary machining operations.

7. The method of claim 6 wherein said step of pushing the workpiece through the hollow interior of the second spindle is carried out by advancing a pusher rod into the hollow interior from one longitudinal end of the second spindle toward the second chuck at the other longitudinal end of the same.

8. The method of claim 7 wherein said pusher rod is mounted on a tool head and the pusher rod is advanced by shifting the tool head towards the first chuck.

9. The method of claim 6, further comprising the step of causing the workpiece, which is being conveyed into the second chuck, to abut against a stopper to stop the workpiece at a predetermined position relative to the second chuck.

* * * * *